US006780273B1

(12) United States Patent
Bradford

(10) Patent No.: US 6,780,273 B1
(45) Date of Patent: Aug. 24, 2004

(54) PROCESS FOR MAKING A PICTURE FRAME

(76) Inventor: Richard N. Bradford, 578 North St., Longwood, FL (US) 32750

( * ) Notice: Subject to any disclaimer, the term of this patent is extended or adjusted under 35 U.S.C. 154(b) by 0 days.

(21) Appl. No.: 10/632,318

(22) Filed: Aug. 4, 2003

(51) Int. Cl.[7] .......... B32B 31/00

(52) U.S. Cl. .......... 156/257; 156/272.8; 156/268; 156/273.7; 156/277; 156/275.1; 156/108; 156/275.3; 156/248; 156/275.7; 156/249; 40/722; 40/765; 40/771; 40/775; 40/776; 40/777; 40/791; 40/795

(58) Field of Search .......... 156/257, 251, 156/272.8, 268, 273.7, 277, 275.1, 108, 275.3, 248, 275.7, 249; 40/722, 765, 771, 775, 776, 777, 791, 795

(56) References Cited

U.S. PATENT DOCUMENTS 6,395,125 B1 5/2002 Bradford .......... 156/277
6,402,878 B1 6/2002 Bradford .......... 156/272.8

*Primary Examiner*—Linda L Gray
(74) *Attorney, Agent, or Firm*—William M. Hobby, III

(57) ABSTRACT

The process for making a picture frame having printed border artwork on a transparent front panel with irregular outer and inner edges and having an attached rear panel having a picture frame folding stand therein. The process includes the printing of border art on a sheet of a material having a covered pressure sensitive adhesive backing and attaching it to the front panel. The front panel is then laser cut along the computer marked cut path to cut along the outside and inside edges of the printed border artwork while cutting a window therein. The cutout window is removed and a thin transparent polymer sheet is attached thereover. A picture frame back is cut with a foldout stand and is attached to the front panel to form the picture frame.

13 Claims, 3 Drawing Sheets

PROCESS FOR MAKING A PICTURE FRAME

BACKGROUND OF THE INVENTION

The present invention relates to a process of making a picture frame and especially to a process of making a picture frame having a decorative border around a center window for mounting a photo or the like.

In the past, it has been common to make a wide variety of picture frames. A typical picture frame is formed having an edge molding having a rectangular shape with mitered corners and having a sheet of transparent glass or plastic, such as an acrylic sheet, mounted under an edge lip on the molding. A mat is positioned under the transparent sheet of glass having a cutout center portion for mounting artwork. Usually a non-porous backing and a stiff backing are positioned behind the artwork within the frame molding. The glass, mat, artwork, and backing can be held in place within the molding using small nails or the like to hold the framed artwork together. A hanger is typically added to the frame which may consist of screw eyes on two sides of the edge molding connected by a hanging wire.

The prior art also includes the use of picture frames made out of acrylic sheets which have had screen printed images on one side of the acrylic sheet. The image is printed to form a border having a transparent center portion where the print can be mounted. This becomes very labor intensive because printing each of the colors in the design requires that the acrylic sheet be passed through the press another time. Designs can also be screen printed onto an acrylic sheet. The screen printing does not produce the fine details in the print and to obtain finer detail requires much more expensive screen printing which still does not produce the fine details produced in off-set printing. This procedure can be utilized for printing solid borders onto an acrylic sheet having a transparent center portion for mounting a picture adjacent thereto for viewing from the other side of the sheet. Decorative frames can also be made using an acrylic sheet having border artwork offset printed onto a piece of paper which is then die cut to the shaped specifications. The die cut printed paper is slid into a clear acrylic frame. This tends to look cheap and unappealing to customers and, in addition, custom dies for custom shapes increases the cost of making the plastic picture frame. In any process, it is also desirable to mount a frame easel or hanger on the back of the acrylic picture frame in order to support the picture frame on a desk or to hang the picture frame on a wall or surface.

My prior U.S. Pat. No. 6,402,878 of Jun. 11, 2002, covers a process for making a picture frame with border artwork. Border artwork is printed on a sheet of material and attached to a transparent panel which is laser cut to conform to the border artwork. The border artwork is zone coated with an adhesive over the printed artwork and attached to the transparent sheet of material so that cutting the printed sheet along the marked cut inside path forms a cutout of the printed sheet which is removed to provide a transparent window for viewing a picture placed therein. The process includes folding the polymer sheet and attaching a frame stand thereto. My prior U.S. Pat. No. 6,395,125 of May 28, 2002 is for a process for making a picture frame which includes the steps of printing border artwork on a transparent sheet of material leaving a transparent center window and making an outer cut path for the printed transparent sheet. The printed transparent sheet is coated with an adhesive and attached to a transparent polymer member which is cut along an outer cut path to form an exterior border edge.

The present invention is an improvement over my prior patents where a process for making a picture frame makes the back frame member from a separate sheet of material having a foldout stand cut thereinto which reduces the cost of manufacturing of a picture frame having a printed and decorative border around a window.

The present process is for making a laminated plastic picture frame having a decorative border which can be made in any desired shape. The high quality and fine print detail are laminated onto a plastic frame without the use of expensive die charges such that small runs are economically feasible while also allowing fast and large production runs.

SUMMARY OF THE INVENTION

A process for making a picture frame having printed border artwork on a transparent front panel has a separately attached rear panel. The process includes the printing of border art and registration marks on the front sheet of material having a pressure sensitive adhesive backing with a protective cover. A cut path is then marked in a computer for cutting the printed artwork edges. The printed border sheet is then front coated with an adhesive and attached to a transparent front panel. The front panel is then, laser cut along the computer marked cut path to cut the surrounding edge of the printed border artwork along the outside of the artwork and along the inside of the artwork to cut out a window in the front panel inside the border artwork. The cutout window is removed and the pressure sensitive backing liner is removed from the border printed sheet attached to the front panel. A thin transparent polymer sheet is attached to a portion of the pressure sensitive adhesive coated sheet material and over the cutout window covering the adhesive up to one edge of the front panel. The process includes marking a cut path in a computer for cutting the picture frame back panel including cutting a foldout picture frame stand into the frame back panel and cutting the picture frame back panel along the marked cut path in the computer. The cut picture frame back panel is then attached to the cut transparent front panel over the border art and over the window covering sheet with the uncovered pressure sensitive adhesive on the border artwork sheet. Since the window covering sheet of polymer material extends to one edge of the adhesive, the space between the one edge and the frame back panel is left unattached so that a display picture can be inserted therebetween and into the window of the picture frame. The picture frame back may be made of a paperboard and have the picture frame stand formed therein to reduce the cost of the picture frame.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
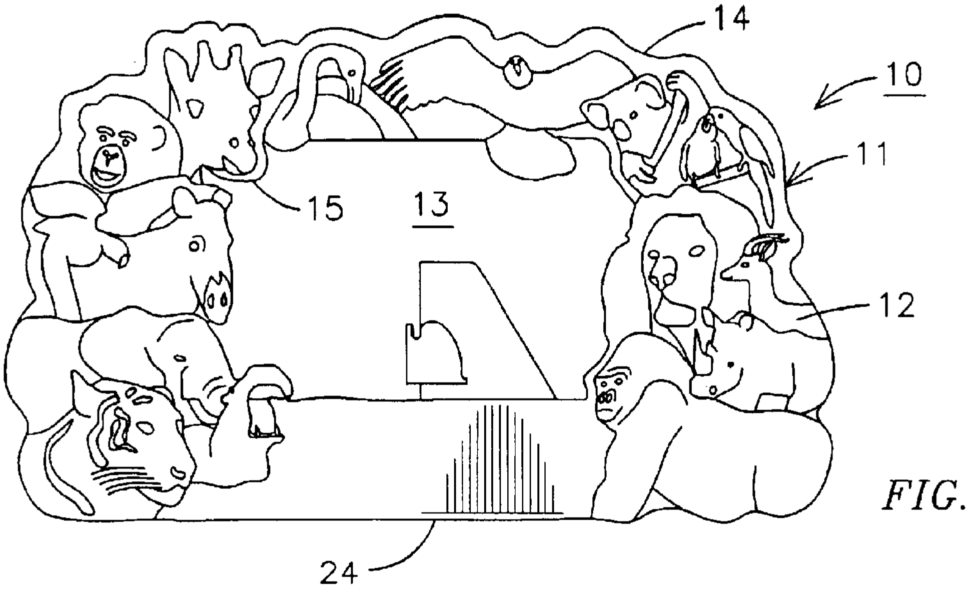
FIG. 1 is a front elevation of a picture frame made in accordance with the present invention.
Figure 2:
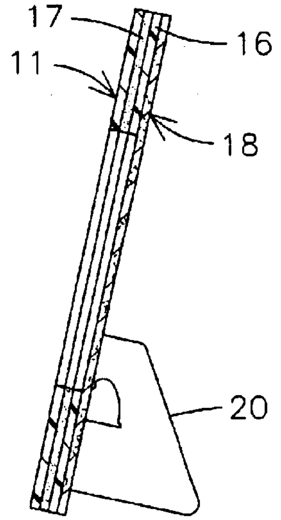
FIG. 2 is a side elevation of the picture frame of FIG. 1.
Figure 3:
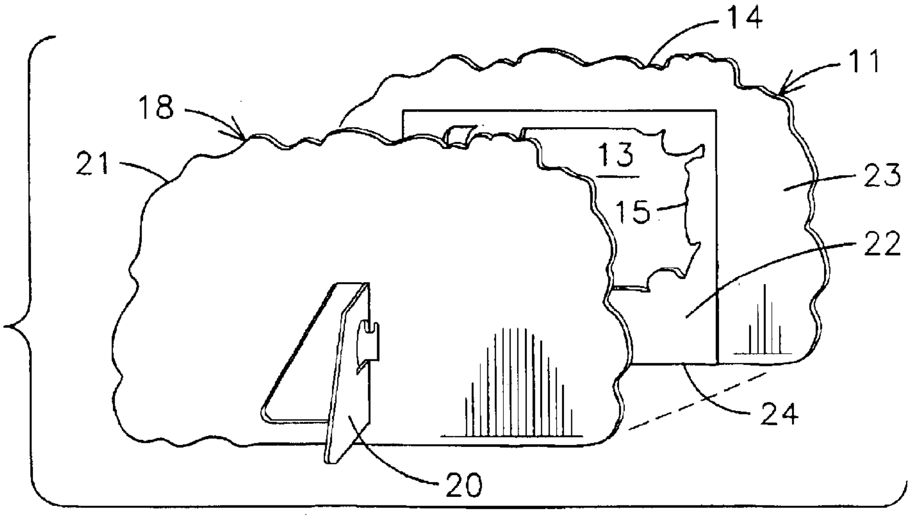
FIG. 3 is an exploded perspective view of the picture frame of FIGS. 1 and 2.

Referring to the drawings and especially to FIGS. 1 through 3, a picture frame 10 is illustrated having a frame front panel 11 made of a thin polymer sheet, such as an acrylic plastic. The frame 10 has border artwork 12 around an open window 13. The polymer panel 11 has been cut along the outer edge 14 to follow the border artwork 12 and has also been cutout along the edge 15 along the inner border artwork 12 and has had the material removed from the window area 13 to leave an open area. The border artwork 12 has been printed on a separate sheet of paper or polymer which has been adhesively attached to the rear of a transparent polymer front panel 11. The printed sheet 16 has been attached with an adhesive 17 to the polymer sheet front panel 11. The frame has a frame back panel 18, which may be made of a paperboard or the like and does not need to be transparent and has a frame foldout stand 20 formed therein for standing the frame in an upright position. The frame back panel 18 has the outer edges 21 cut to follow the contour of the frame front panel 11 so that when attached, it forms one irregular border which follows the artwork of the border design 12 on the outside. A thin sheet of transparent polymer 22 has been attached to the back of the transparent front panel 11 having the artwork border 12 attached thereto covering only a portion of the back surface 23 but extending to the edge 24. By covering the adhesive to the edge 24, a pocket will be formed when the back panel is attached thereover for sliding a picture between the frame back panel 18 and the frame front panel 11 behind the polymer window covering sheet 22.

Figure 4:
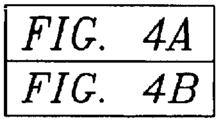
FIGS. 4A & 4B is a flow diagram of the process of making a picture frame in accordance with the present invention.
Figure 4A:
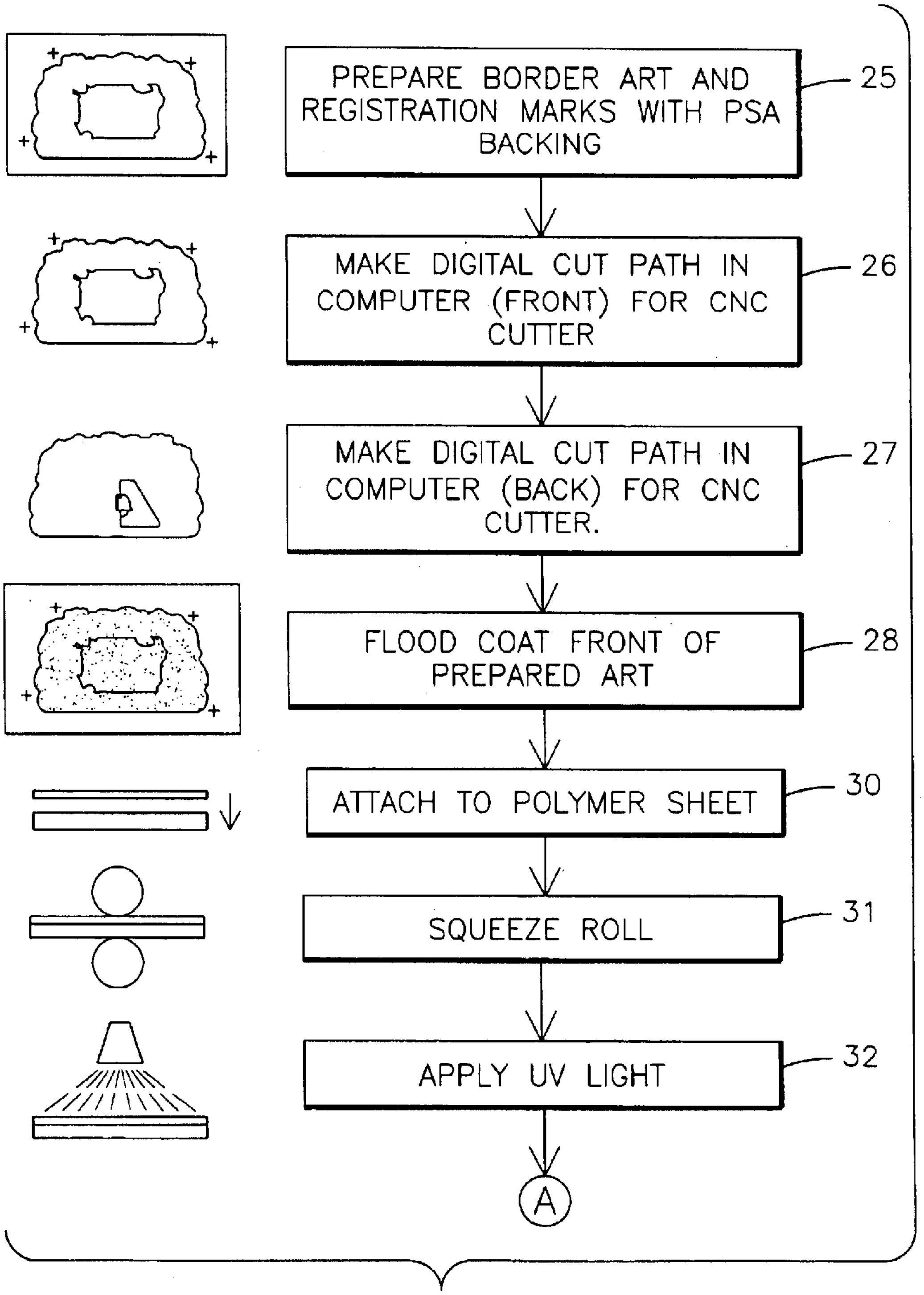

Turning to FIG. 4, the process of making the frame of FIGS. 1 through 3 is illustrated starting with the printing and preparation (25) of the border art and registration marks onto a pressure sensitive adhesive (PSA) backing, which backing has a protective covering. The border art and registration marks may be printed on paper or on a thin sheet of polymer or any material desired by offset lithography or any printing process desired. A cut path is then made (26) in a computer for cutting the front panel 11 with a computer numerical cutter along a path to follow the edge 14 of the artwork 12 and to form a cut path to cut the window along the inside edges 15 of the artwork to form a window inside of the border artwork 12. A digital cut path is then made (27) for a computer numerical cutter (CNC) for the frame back 18. The prepared border art having a backing of pressure sensitive adhesive is flood coated (28) with an adhesive on the front and is then attached (30) to a transparent polymer panel 11. The attached artwork and polymer sheet are squeeze rolled (31) to adhere the pieces together as well as to remove air bubbles or the like to provide a clear view of the artwork 12 through the transparent polymer front 11. An ultraviolet light is then applied to the adhesive located between the prepared border artwork and the transparent polymer sheet to activate the adhesive by the applying (32) of the UV light to the transparent portion of the front transparent panel 11.

Figure 4B:
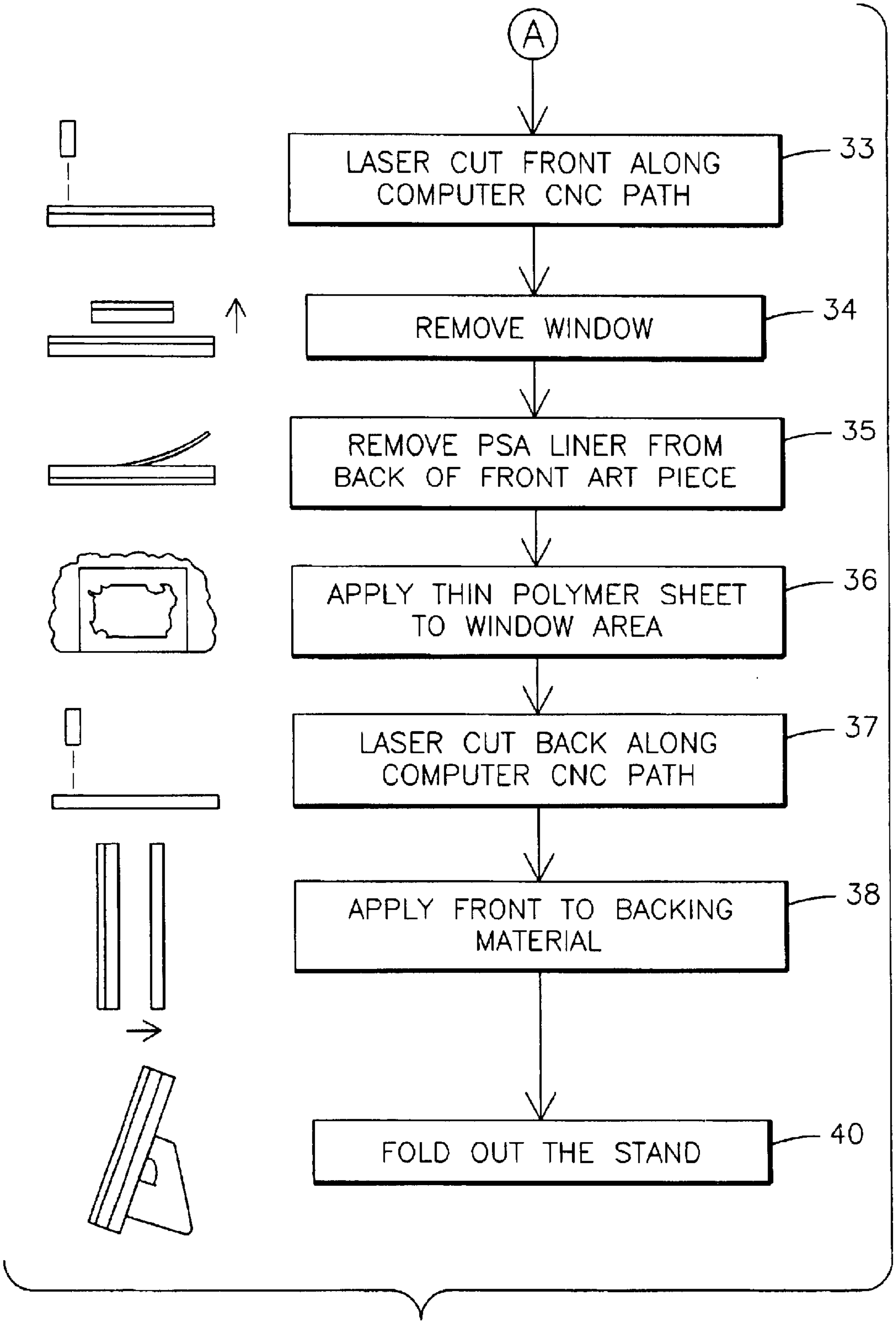

The process continues in FIG. 4B with a computer numerical laser cutter cutting (33) the front frame member 11 along the computer cut paths to form the exterior edge 14 cut in an irregular fashion to follow the printed artwork 12 and cutting along the interior of the border design 15 to form a window 13 when the cutout portion is removed from the inside cut. The window is removed 34 and the pressure sensitive adhesive liner or covering from the back of the front panel art work 12 is peeled away (35). A thin transparent polymer sheet is applied (36) to the back of the front panel 11 covering the window 13 but only covering a portion of the pressure sensitive adhesive coating on the back but covering to the bottom edge 24. The back 18 is laser cut (37) along the computer marked path with a computer numerical cutter. The back may be cut out of paperboard or a polymer material or any material desired but can be a less expensive material than the transparent frame front panel 11 to reduce the cost of the overall frame. The laser cut path also has been marked to have the foldout frame stand 20 cut directly into the back panel 18. The back 18 is now applied (38) to the open adhesive cover back 23 of the front panel 11, such that the edges 14 and the edges 21 are in alignment. The adhesive in the area 23 surrounding the outside portion of the rear of front panel 11, attaches to the back panel 18 but leaving unattached an area along the edge 24 where the thin polymer sheet 22 extends to one of the front panel 11 and covering the adhesive layer to the edge 24. This allows a picture to be inserted between the back 18 and the front panel 11 adjacent the thin polymer covering 22 to display the picture within the window 13 surrounded by the border art 12. The foldout stand 20 can then be folded out (40) to set up the frame.

It should be clear at this time that a process of making an acrylic or transparent polymer picture frame having a separate backing may be made of a separate backing material and having a high quality printed border having irregular inside and outside edges has been provided. It should however also be clear that the present invention is not to be limited to the forms shown which are to be considered illustrative rather than restrictive.

I claim:

1. A process of making a picture frame having printed border art work on a transparent front panel and having an attached rear panel comprising the steps of:

printing border art work and registration marks on the front of a sheet of material having a pressure sensitive adhesive backing with a protective cover;

marking a cut path in a computer for cutting along the edge of said printed art;

coating the front of said printed border sheet material with an adhesive;

attaching said adhesive coated printer border sheet material to a transparent front panel;

cutting said transparent front panel along said computer marked cut path along the edge of said printed border art work;

removing a cutout window formed by said laser cutting said transparent front panel;

removing the pressure sensitive adhesive backing protective cover from said cut printed border sheet material;

attaching a transparent polymer sheet to a portion of said pressure sensitive adhesive backing on said printed border sheet material to cover the back of said cutout window in said transparent front panel;

cutting a frame back panel for said cut transparent front panel; and attaching said cut frame back panel to said cut transparent front panel over said border art work and window covering sheet of polymer material to form a picture frame with printed decorative borders.

2. The process of making a picture frame in accordance with claim 1 including the step of marking a cut path in a computer for cutting said picture frame back panel.

3. The process of making a picture frame in accordance with claim 2 including the step of laser cutting said picture frame back panel along said cut path marked in said computer.

4. The process of making a picture frame in accordance with claim 1 including the step of laser cutting said transparent front panel along said computer marked cut path.

5. The process of making a picture frame in accordance with claim 1 in which the step of attaching a transparent polymer sheet includes attaching said transparent polymer sheet to cover the adhesive at one edge of said transparent front panel to thereby leave one edge between said frame back panel and said transparent polymer sheet unattached for sliding a picture therebetween.

6. The process of making a picture frame in accordance with claim 1 including the step of squeeze rolling said transparent front panel and attached adhesive coated printed border sheet material together.

7. The process of making a picture frame in accordance with claim 6 including the step of exposing said adhesive coated printed border sheet material attached to said transparent front panel with a ultraviolet source through said transparent front panel.

8. The process of making a picture frame in accordance with claim 3 in which the step of cutting a frame back panel includes cutting a frame back panel from a sheet of paper board.

9. The process of making a picture frame in accordance with claim 8 in which the step of cutting a sheet of transparent front panel includes cutting an acrylic front panel.

10. The process of making a picture frame in accordance with claim 1 in which the step of printing border art work includes offset printing of the border art work onto paper.

11. The process of making a picture frame in accordance with claim 3 including the step of cutting a fold out picture frame stand into said frame back panel.

12. The process of making a picture frame in accordance with claim 10 including the step of laser cutting a fold out picture frame stand into said frame back panel.

13. The process of making a picture frame in accordance with claim 5 including the step of sliding a picture between said frame back panel and said window covering polymer sheet.

* * * * *